US012663965B2

(12) United States Patent
Takenaka et al.

(10) Patent No.: US 12,663,965 B2
(45) Date of Patent: Jun. 23, 2026

(54) INFORMATION PROCESSING CIRCUIT AND METHOD OF DESIGNING INFORMATION PROCESSING CIRCUIT

(71) Applicant: NEC Corporation, Tokyo (JP)

(72) Inventors: Takashi Takenaka, Tokyo (JP); Hiroaki Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1098 days.

(21) Appl. No.: 17/771,143

(22) PCT Filed: Oct. 31, 2019

(86) PCT No.: PCT/JP2019/042927
§ 371 (c)(1),
(2) Date: Apr. 22, 2022

(87) PCT Pub. No.: WO2021/084717
PCT Pub. Date: May 6, 2021

(65) Prior Publication Data
US 2022/0413806 A1 Dec. 29, 2022

(51) Int. Cl.
*G06F 7/544* (2006.01)
*G06N 3/063* (2023.01)
(52) U.S. Cl.
CPC ........... *G06F 7/5443* (2013.01); *G06N 3/063* (2013.01)
(58) Field of Classification Search
CPC .............................. G06F 7/5443; G06N 3/063
See application file for complete search history.

(56) References Cited

U.S. PATENT DOCUMENTS

| | | | | |
|---|---|---|---|---|
| 12,453,072 B2 * | 10/2025 | Kimura | .................. | H10B 12/00 |
| 2018/0053084 A1 | 2/2018 | Li et al. | | |
| 2019/0244095 A1 | 8/2019 | Huang et al. | | |
| 2019/0266485 A1 | 8/2019 | Singh et al. | | |
| 2019/0294957 A1 * | 9/2019 | Tachibana | ............ | G06N 3/0499 |

FOREIGN PATENT DOCUMENTS

| | | |
|---|---|---|
| CN | 108764467 A | 11/2018 |
| CN | 110197253 A | 9/2019 |
| JP | 2004-086374 A | 3/2004 |
| JP | 2018-124754 A | 8/2018 |
| JP | 2018-132830 A | 8/2018 |
| JP | 2019-139742 A | 8/2019 |
| TW | 201807622 A | 3/2018 |

OTHER PUBLICATIONS

International Search Report for PCT Application No. PCT/JP2019/042927, mailed on Jan. 7, 2020.

(Continued)

*Primary Examiner* — Michael D. Yaary
(74) *Attorney, Agent, or Firm* — Sughrue Mion, PLLC

(57) ABSTRACT

The information processing circuit 10 performs operations on layers in deep learning, and includes a product sum circuit 11 which performs a product-sum operation using input data and parameter values, and a parameter value output circuit 12 which outputs the parameter values, wherein the parameter value output circuit 12 is composed of a combinational circuit.

14 Claims, 9 Drawing Sheets

(56) References Cited

OTHER PUBLICATIONS

English translation of Written opinion for PCT Application No. PCT/JP2019/042927, mailed on Jan. 7, 2020.

Whatmough Pau I N., et al., "FIXYNN:Efficient Hardware for Mobile Computer Vision via Transfer Learning", arXiv [online], Cornell University Library, Feb. 27, 2019, pp. 1-13, [Retrieved on Dec. 19, 2019], Internet: URL:https://arxiv.org/pdf/1902.11128.pdf.

TW Office Action for TW Application No. TW109128738, mailed on Nov. 14, 2022 with English Translation.

* cited by examiner

311

| A | B | C | Z1 | Z2 |
|---|---|---|----|----|
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 0 |
| 1 | 0 | 1 | 0 | 1 |
| 1 | 1 | 0 | 0 | 1 |
| 1 | 1 | 1 | 1 | 0 |

312

| A | B | C | Z1 | Z2 |
|---|---|---|----|----|
| * | 0 | 0 | 0 | 0 |
| * | 0 | 1 | 0 | 1 |
| * | 1 | 0 | 0 | 1 |
| * | 1 | 1 | 1 | 0 |

500

INFORMATION PROCESSING CIRCUIT DESIGNING DEVICE

501

PARAMETER → PARAMETER TABLE OPTIMIZATION UNIT

502

PARAMETER TABLE GENERATOR → CIRCUIT CONFIGURATION OF PARAMETER TABLE

NETWORK STRUCTURE → PARALLEL DEGREE DETERMINATION UNIT

503

CALCULATOR GENERATOR → CIRCUIT CONFIGURATION OF CALCULATOR

Figure 11:
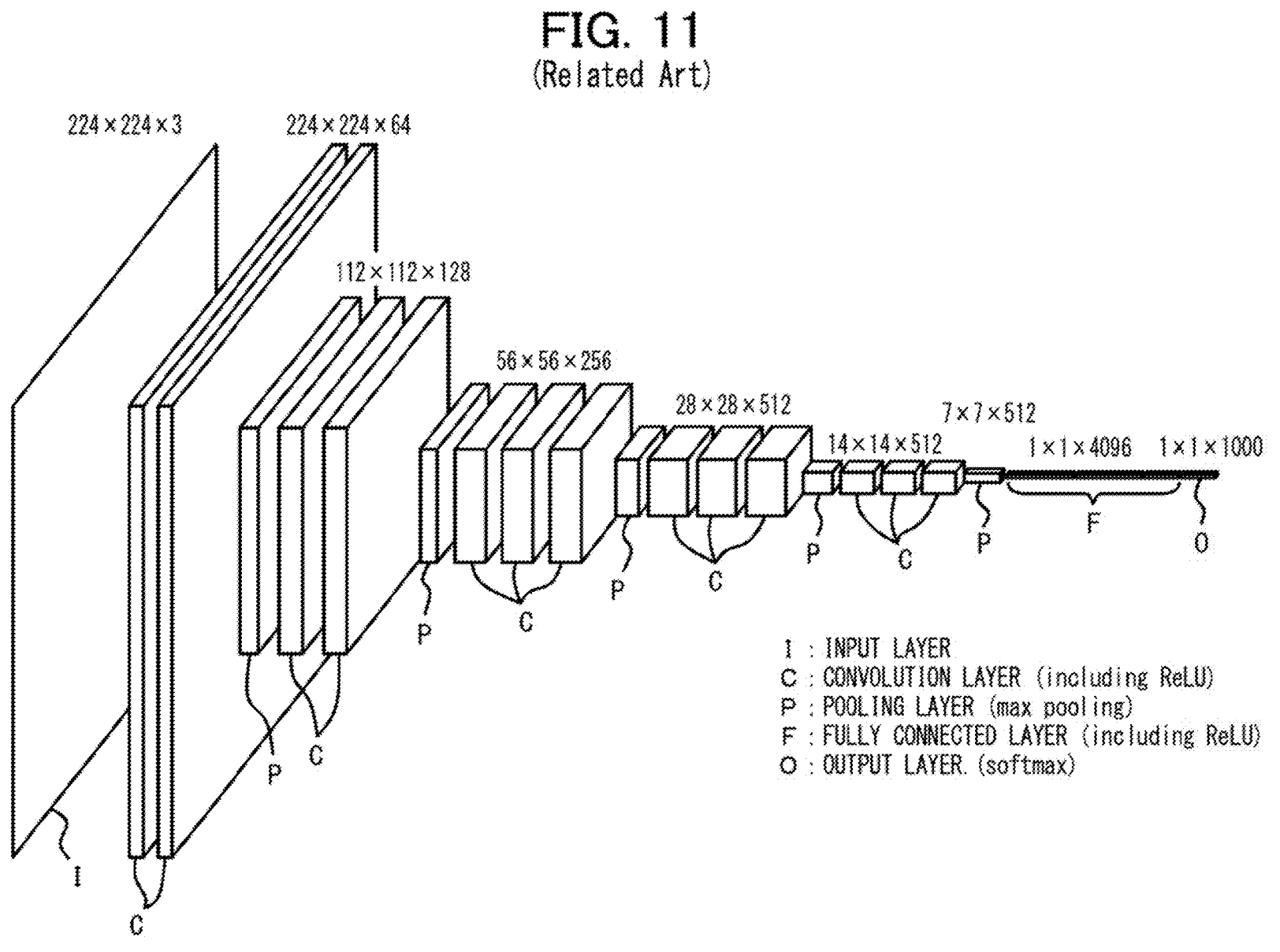

I : INPUT LAYER
C : CONVOLUTION LAYER (including ReLU)
P : POOLING LAYER (max pooling)
F : FULLY CONNECTED LAYER (including ReLU)
O : OUTPUT LAYER (softmax)

224 × 224 × 3
224 × 224 × 64
112 × 112 × 128
56 × 56 × 256
28 × 28 × 512
14 × 14 × 512
7 × 7 × 512
1 × 1 × 4096
1 × 1 × 1000

INFORMATION PROCESSING CIRCUIT AND METHOD OF DESIGNING INFORMATION PROCESSING CIRCUIT

This application is a National Stage Entry of PCT/JP2019/042927 filed on Oct. 31, 2019, the contents of all of which are incorporated herein by reference, in their entirety.

TECHNICAL FIELD

This invention relates to an information processing circuit that performs the inference phase of deep learning, and to a method for designing such an information processing circuit.

BACKGROUND ART

Deep learning is an algorithm using a multilayer neural network (hereinafter, referred to as a network). Deep learning involves a training phase in which each network (layer) is optimized to generate a model (learned model), and an inference phase in which an inference is made based on the learned model. The model may also be referred to as an inference model. Hereinafter, the model is sometimes referred to as an inference unit (a reasoner).

In the training phase and the inference phase, calculation is executed for adjusting weights as parameters or using input data and weights as operands, and their calculation amounts are large. As a result, the processing time of each phase becomes long.

In order to accelerate deep learning, an inference unit realized by a GPU (Graphics Processing Units) is often used rather than an inference unit realized by a CPU (Central Processing Unit). In addition, accelerators dedicated to deep learning have been put to practical use.

FIG. 11 is an explanatory diagram showing a structure of VGG (Visual Geometry Group)-16 that is an example of a convolutional neural network (CNN). VGG-16 includes 13 convolution layers and 3 fully connected layers. Features extracted in the convolution layer or in the convolution and pooling layers are classified in the fully connected layer.

In FIG. 11, "I" indicates an input layer. "C" indicates a convolution layer. In FIG. 11, the convolution layer is 3×3 convolution layer. Thus, for example, the first convolution operation shown in FIG. 11 includes a product-sum operation of 3 (vertical size)×3 (horizontal size)×3 (input channels)×64 (output channels) per a pixel. For example, the convolution layer of the fifth block in FIG. 11 includes a product-sum operation of 3 (vertical size)×3 (horizontal size)×3 (output channel)×512 (input channels)×512 (output channels) per pixel. "P" indicates a pooling layer. In the CNN shown in FIG. 11, the pooling layer is the Max Pooling layer. "F" indicates a fully connected layer. "0" indicates an output layer. In the output layer, a softmax function is used. The convolutional and fully connected layers include ReLU (Rectified Linear Unit). The multiplication formula attached to each layer represents the vertical size×horizontal size×the number of channels of data corresponding to a single input image. The volume of the rectangle representing a layer corresponds to the amount of activation in the layer.

CITATION LIST

Patent Literature

PTL 1: Japanese Patent Application Laid-Open No. 2019-139742

Non-Patent Literature

NPL 1: P. N. Whatmough et al., "FixyNN: Efficient Hardware for Mobile Computer Vision via Transfer Learning", Feb. 27, 2019

SUMMARY OF INVENTION

Technical Problem

There are two main ways to realize an inference unit by an accelerator.

Taking a circuit processing CNN as an example, in the first method, a circuit processing CNN is configured to execute operations of the multiple layers that make up the circuit processing CNN by a common calculator (refer to paragraph 0033, etc. of PTL 1, for example).

FIG. 12 an explanatory diagram showing a schematic calculator of a circuit processing CNN configured to execute calculation of multiple layers by a common calculator. The part that executes the calculation in the inference unit comprises a calculator 700 and a memory (for example, DRAM (Dynamic Random Access Memory)) 900. The calculator 700 shown in FIG. 12 forms a number of adders and a number of multipliers. In FIG. 12, "+" indicates an adder. "*" indicates a multiplier. Although three adders and six multipliers are shown in FIG. 12, the number of adders and multipliers that can execute calculation of all layers in a circuit processing CNN is formed.

When calculation is to be performed on each layer of the inference unit, the calculator 700 reads parameters for one layer in which the operation is to be performed from DRAM 900. Then, the calculator 700 executes a product-sum operation for the layer, using the parameters as coefficients.

In the second method, a circuit processing CNN is configured to execute an operation of each layer of CNN by a corresponding calculator to each layer (refer to NPL 1, for example). NPL 1 describes that a CNN is divided into two stages, and calculators corresponding to each of layers in the first stage are provided.

FIG. 13 is an explanatory diagram showing a schematic CNN with calculators corresponding to each of layers. FIG. 13 illustrates six layers 801, 802, 803, 804, 805, and 806. The calculator (circuit) 701, 702, 703, 704, 705, and 706 corresponding to each of layers 801, 802, 803, 804, 805, and 806 are provided.

Since the calculators 701-706 execute calculation corresponding to each of layers 801, 802, 803, 804, 805, and 806, the circuit configuration of each of the calculators 701-706 is fixed if parameters are fixed. Non-patent document 1 describes that the parameters are fixed values.

In the first method described above, since DRAM 900 is provided, if the parameters of CNN are changed, its functions are performed without changing the circuit configuration of the calculators 701-706. However, the data transfer rate of the DRAM 900 is slow compared to the calculation speed of the calculator 700. In other words, the memory bandwidth of DRAM 900 is narrow. Therefore, the data transfer between the calculator 700 and the memory becomes a bottleneck. As a result, the calculation speed of the circuit processing CNN is limited.

In the second method described above, since calculators 701-706 are provided for each of the layers, the whole circuit scale of the circuit processing CNN becomes larger.

In the method described in NPL 1, by fixing parameters and a network configuration, the circuit scale of the adders and multipliers of the circuit processing CNN is reduced.

However, since the method described in NPL 1 is configured to allow fully-parallel processing at each layer, the circuit scale increases by such a circuit configuration. In addition, since the circuit is configured so that the calculation corresponding to each of input channels and output channels is executed in parallel for each layer, the circuit scale becomes larger by such a circuit configuration. Further, since the circuit is configured to allow completely parallel processing for each layer, it is preferable that the processing times for input data corresponding to a single image are the same for each layer.

In a CNN, the later the layer (closer to the output layer), in general, the smaller the vertical or horizontal size of the input data corresponding to a single image may be. For example, the pooling layer reduces the vertical and horizontal sizes of the input data corresponding to a single image. In the case that each layer processes the data corresponding to a single input image in the same amount of time, the calculation amount in the later layer will be smaller, unless the number of channels in the later layer is extremely large. In other words, the later layer, the smaller the circuit scale for executing calculation in the layer may be. However, in the method described in NPL 1, since the calculator 700 is configured to be able to perform operations of all input and output channels in parallel, the input data corresponding to a single image is processed quickly for a layer of smaller vertical and horizontal sizes of the input data, and there is a waiting period until input data corresponding to the next image is supplied. In other words, the utilization of the 700 calculator is lower.

The configuration of the circuit processing CNN described in NPL 1 is a CNN is divided into two stages, and calculators corresponding to each of layers are provided in the first stage. In the latter stage, parameters are transferred to DRAM and a programmable accelerator is used as a calculator. In other words, the circuit processing CNN is configured to be able to respond to changes in parameters and a network configuration to a certain extent. NPL 1 does not describe that parameters and network configuration are fixed in the circuit processing CNN as a whole i.e., in the inference unit as a whole.

It is an purpose of the present invention to provide an information processing circuit that is free from memory bandwidth limitation and improves utilization of a calculator in each layer in the inference unit when the inference unit is realized in hardware, and a method for designing an information processing circuit.

Solution to Problem

The information processing circuit according to the present invention includes a product sum circuit which performs a product-sum operation using input data and parameter values, and a parameter value output circuit which outputs the parameter values, wherein the parameter value output circuit is composed of a combinational circuit.

The method of designing an information processing circuit according to the present invention is a design method for generating the information processing circuit performing operations on layers in deep learning, and includes inputting data for identifying multiple learned parameter values and a network structure, generating a product sum circuit which performs a product-sum operation using input data and the parameter values, and specializing in a layer in the network structure, and generating a combinational circuit outputting the multiple parameter values.

The program of designing an information processing circuit according to the present invention is a program for generating the information processing circuit performing operations on layers in deep learning, and causes a processor to execute a process of inputting data for identifying multiple learned parameter values and a network structure, a process of generating a product sum circuit which performs a product-sum operation using input data and the parameter values, and specializing in a layer in the network structure, and a process of generating a combinational circuit outputting the multiple parameter values.

The information processing circuit designing device according to the present invention is a device which generates the information processing circuit performing operations on layers in deep learning, and includes input means for inputting data for identifying multiple learned parameter values and a network structure, calculator generation means for generating a product sum circuit which performs a product-sum operation using input data and the parameter values, and specializing in a layer in the network structure, and parameter value output circuit generation means for generating a combinational circuit outputting the multiple parameter values.

Advantageous Effects of Invention

According to the present invention, it is possible to obtain an information processing circuit that is free from memory bandwidth constraints and that improves the utilization of each layer of calculators in the inference unit.

BRIEF DESCRIPTION OF DRAWINGS

FIG. 11 It depicts an explanatory diagram showing a structure of VGG-16.

DESCRIPTION OF EMBODIMENTS

Hereinafter, an example embodiment of the present invention will be described with reference to the drawings. In the following explanation, a CNN inference unit will be used as an example of an information processing circuit. In addition, an image (image data) will be used as an example of data input to the CNN.

Figures 12, 13:
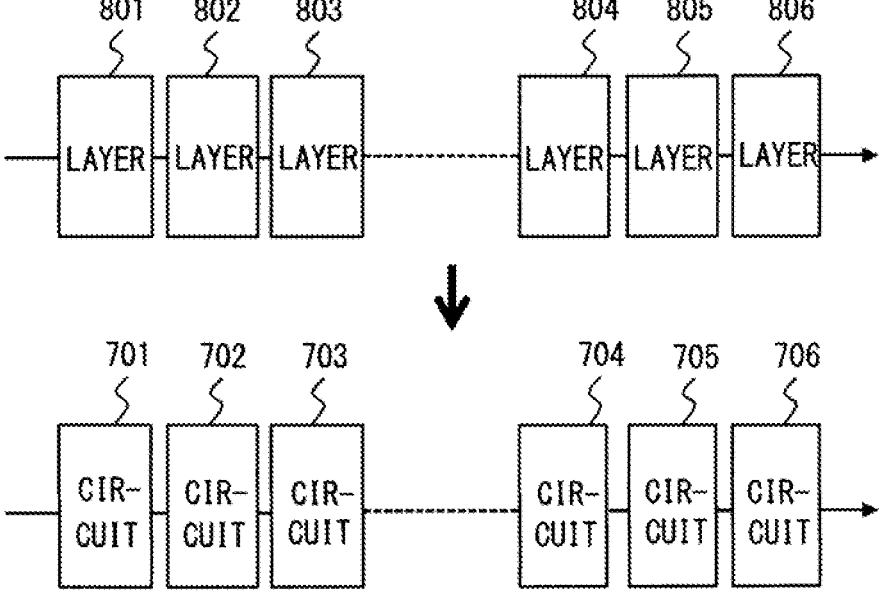
FIG. 12 It depicts an explanatory diagram showing a schematic calculator of a CNN configured to execute operations of multiple layers using a common calculator.
FIG. 13 It depicts an explanatory diagram showing a schematic CNN with calculators corresponding to each of layers.

Similar to the configuration illustrated in FIG. 13, the information processing circuit is a CNN inference unit in which calculators corresponding to each layer of the CNN are installed. The information processing circuit realizes a CNN inference unit with fixed parameters and a fixed network configuration (type of deep learning algorithm, how many layers of what type and in what order, size of input data and output data for each layer, etc.). In other words, the information processing circuit is a circuit with a circuit configuration specialized for each layer of the CNN (for example, each of the convolutional and fully connected layers). Specialization means that it is a dedicated circuit that exclusively executes calculation of the layer.

The fact that the parameters are fixed means that the training phase process is completed, the appropriate parameters are determined, and the determined parameters are used. However, in this example embodiment, the parameters determined in the training phase may be changed. Hereinafter, changing the parameters is sometimes expressed as "parameter is optimized".

In the inference unit using the information processing circuit according to the present invention, the parallel degree is determined by taking into account the data input speed and processing speed. The multiplier multiplying parameters (weights) by input data in the inference unit comprises a combinational logic circuit (combinational circuit). Alternatively, the multiplier may be composed of a pipelined calculator or an ordinal circuit.

Figure 1:
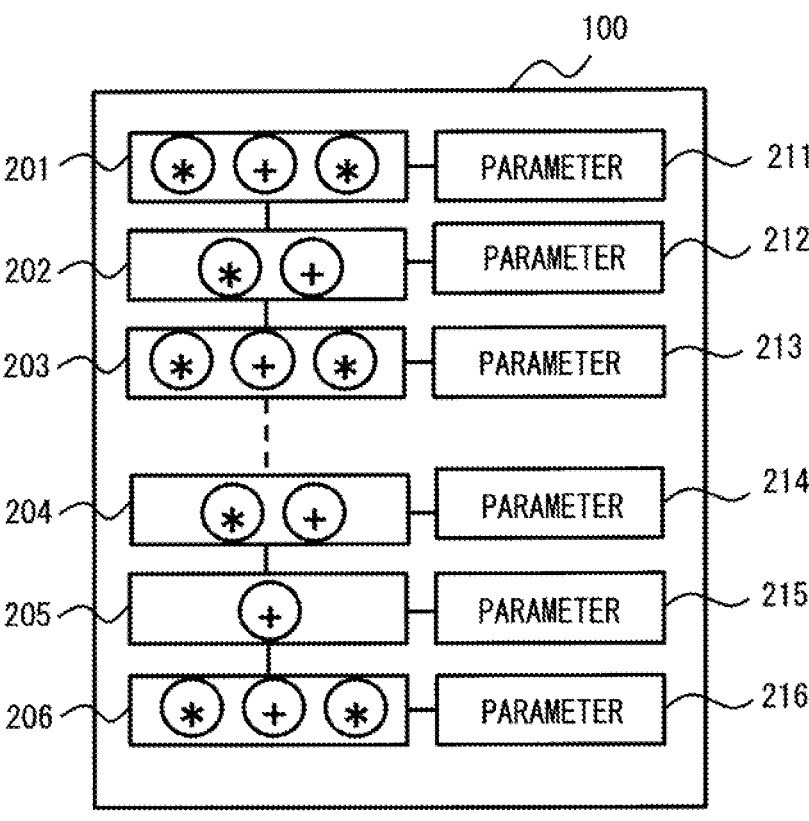
FIG. 1 It depicts an explanatory diagram showing a schematic information processing circuit of an example embodiment.

FIG. 1 is an explanatory diagram showing a schematic information processing circuit of this example embodiment. Calculators 201, 202, 203, 204, 205, and 206 in an information processing circuit 100 realizing a CNN are illustrated in FIG. 1. Thus, in FIG. 1, six calculators are illustrated. Each of the calculators 201, 202, 203, 204, 205, and 206 perform a product-sum operation for parameters 211, 212, 213, 214, 215, and 216 used in a layer and input data. The calculators 201 to 206 are realized in multiple combinational circuits. Parameters 211 to 216 are also realized in combinational circuits.

A combinational circuit includes a negative AND circuit (NAND circuit), a negative OR circuit (NOR circuit), a negative circuit (an inverting circuit (NOT circuit)), or an combination of those circuits. In the following description, one circuit element may be described as a combinational circuit, but a circuit including multiple circuit elements (NAND circuit, NOR circuit, NOT circuit, etc.) may also be described as a combinational circuit.

In FIG. 1, "+" indicates an adder. The "*" indicates a multiplier. The number of adders and multipliers shown in the block of calculators 201-206 for each layer illustrated in FIG. 1 is merely an example for expression.

In this example embodiment, parallel operations are performed in each of the calculators 201-206, and each circuit executes calculation in parallel operations is regarded as a basic circuit. The basic circuit is pre-determined according to the type of layer.

Figure 2:
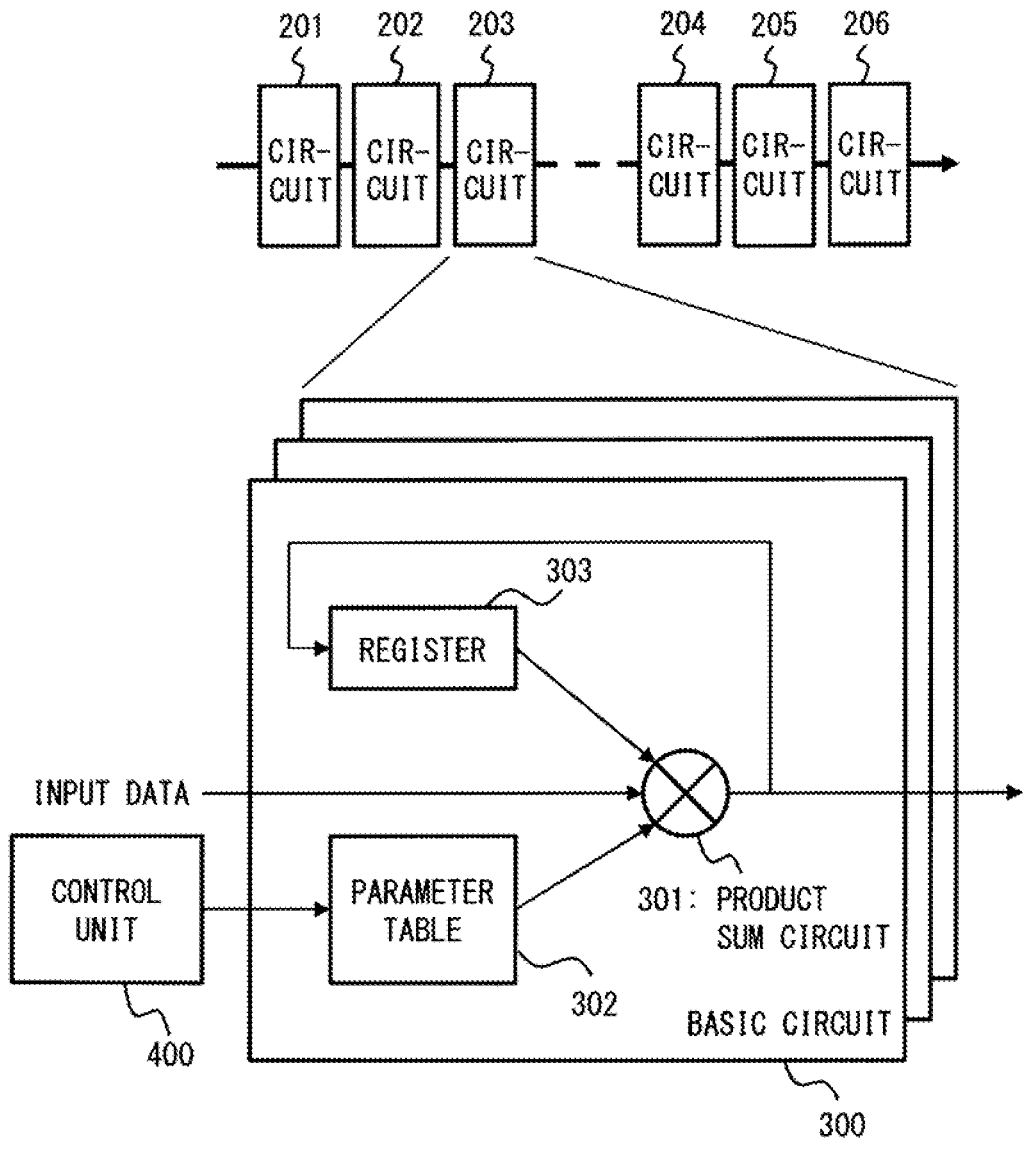
FIG. 2 It depicts an explanatory diagram showing an example of a configuration of a basic circuit.

FIG. 2 illustrates an explanatory diagram showing an example of a configuration of a basic circuit. Calculators (circuits) 201, 202, 203, 204, 205, and 206 in each of six layers are illustrated. In each layer, basic circuits 300 corresponding to the number of parallel processes are provided. FIG. 2 shows an example of basic circuit 300 included in the calculator 203, but each of calculators 201, 202, 204, 205, and 206 in other layers of has a similar circuit configuration.

In the example shown in FIG. 2, the basic circuit 300 includes a product sum circuit 301 which multiplies input data and parameter values from a parameter table (weight table) 302, and adds the multiplied values. The input data may be a single value. The input data may be a group of multiple values. Although FIG. 2 shows a parameter table 302 that stores parameter values, the parameter values are not actually stored in a memory (a memory circuit), but rather the parameter table 302 is realized in a combinational circuit. Since the parameters are fixed in this example embodiment, the parameter table 302 outputs parameter values which are fixed values. The parameter table 302 may output a single value. The parameter table 302 may also output a group of multiple values. The product sum circuit 301 may multiply one input value by one parameter value. The product sum circuit 301 may also perform multiplication of a group of input values by a group of parameter values. The product sum circuit 301 may execute the calculation of the aggregate sum of a group of results of the multiplication of the pair of input values and the pair of parameter values. In general, multiple parameters or multiple groups of parameter values are used for a single layer, and a control unit 400 controls which parameters are output.

The basic circuit 300 may include a register 303 that temporarily stores product-sum operation values. The product sum circuit 301 may include an adder that adds a plurality of multiply values temporarily stored in the register 303. An output of another basic circuit 300 may be connected to the input of the basic circuit 300.

Figures 3, 4:
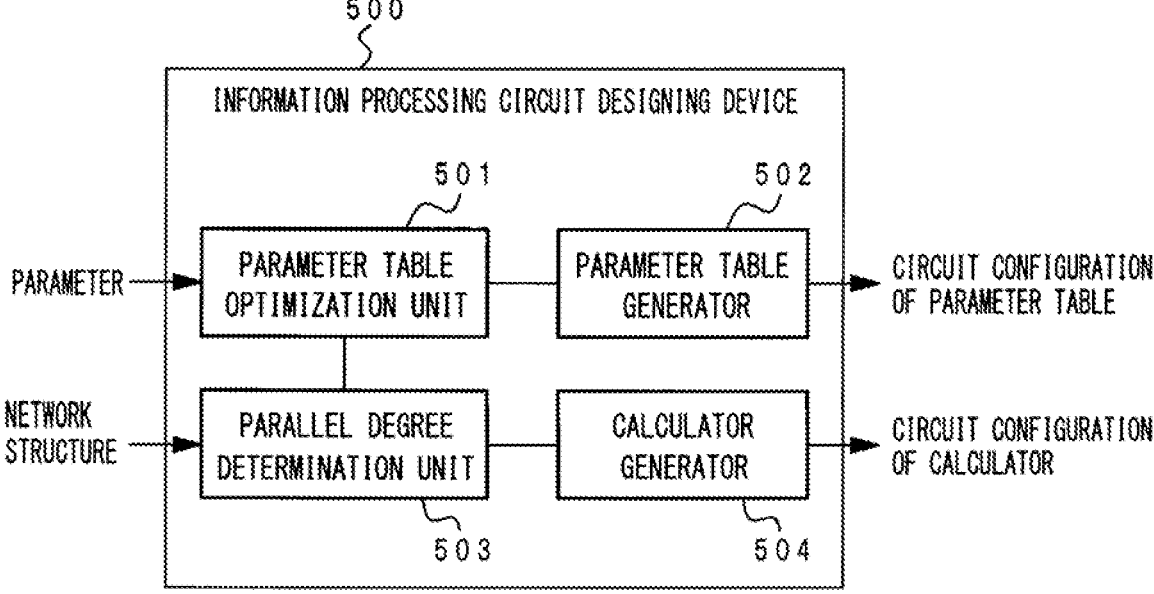
FIG. 3 It depicts an explanatory diagram for explaining of an example circuit configuration of a parameter table.
FIG. 4 It depicts a block diagram showing an example of an information processing circuit designing device.

FIG. 3 illustrates an explanatory diagram for explaining of an example circuit configuration of a parameter table 302. The left side in FIG. 3 shows an example of a truth table 311. The truth table 311 can be realized in a combinational circuit. A, B, and C are inputs to the combinational circuit, respectively. Z1 and Z2 are outputs of the combinational circuit. In the left side in FIG. 3, as an example, the truth table 311 for all adders is illustrated, where A, B, and C can be regarded as addresses, and Z1 and Z2 as output data. That is, Z1 and Z2 can be regarded as output data for the specified addresses A, B, and C. By mapping output data to parameter values, desired parameter values can be obtained in response to some input (specified address).

For example, when the desired parameter value can be determined independently of a particular input value (A in the truth table 311), a simplified truth table 312 may be used. The truth table 312 is simplified so that the parameter values are determined by inputs B and C in the truth table 311. In other words, when the parameter table 302 is realized in a combinational circuit, the fewer the different types of inputs that determine the parameters, the smaller the circuit scale of the combinational circuit. In general, known techniques such as the Quine-McCluskey method are used to simplify the truth table.

The calculator 203 shown in FIG. 2 includes a control unit 400. When the parameter values in the parameter table 302 are realized as output data according to the specified address as shown in FIG. 2, the control unit 400 supplies data of the designated address corresponding to the output data to the parameter table 302 at the desired timing. The parameter table 302 outputs output data, that is a parameter value, corresponding to the designated address to the product sum circuit 301. The desired timing is the time when the product sum circuit 301 performs a multiplication operation using the parameter values to be output from the parameter table 302.

Next, a design method for designing the calculator illustrated in FIG. 2 is explained.

FIG. 4 is a block diagram showing an example of an information processing circuit designing device that designs the circuit configuration of the parameter table and the circuit configuration of the calculator for each layer of the CNN. In the example shown in FIG. 4, the information processing circuit designing device 500 includes a parameter table optimization unit 501, a parameter table generator 502, a parallel degree determination unit 503, and a calculator generator 504.

The parallel degree determination unit 503 inputs a network structure (specifically, data indicating the network structure). The calculator generator 504 outputs the circuit configuration of the calculator for each layer. The parameter table optimization unit 501 inputs a parameter set (a weight in each layer) learned in the training phase and a parallel degree determined by the parallel degree determination unit 503. The parameter table generator 502 outputs the circuit configuration of the parameter table.

The parallel degree determination unit 503 determines the parallel degree for each layer. The parameter table optimization unit 501 optimizes the parallel degree for each layer based on the input parameters for each layer and the parallel degree for each layer determined by the parallel degree determination unit 503. The number of parameter tables is determined by the parallel degree, and the parameter table optimization unit 501 optimizes parameters in each of the multiple parameter tables 302. Here, optimization means reducing the circuit area of the combinational circuit corresponding to the parameter table.

For example, when the convolutional operation to be performed in the layer for which the parallel degree is to be determined (the target layer) includes 3×3×128×128 (=147456 product-sum operation (product-sum operation on parameter values and activation values)), in the case where the parallel degree is determined to be "128", the number of basic circuits 300 (parallel degree) is 128. Each of the 300 basic circuits performs 1152 (147456/128) product-sum operations. In that case, in the basic circuit 300, 128 parameter tables each having 1152 parameter values are provided. As mentioned above, the parameter table 302 is not realized in a memory circuit, but in a combinational circuit.

As described below, the parameter table optimization unit 501 uses a predefined method to optimize the parameters of the parameter table 302. The parameter table generator 502 outputs a circuit configuration to realize a parameter table 302 including the optimized parameter values as the circuit configuration of the parameter table.

The calculator generator 504 inputs the parallel degree for each layer determined by the parallel degree determination unit 503. The calculator generator 504 generates, for each layer, a circuit configuration in which the number of basic circuits 300 are arranged. The number is indicated by the parallel degree. Then, the calculator generator 504 outputs the generated circuit configuration for each layer as the circuit configuration of the calculator.

Although each component in the information processing circuit designing device 500 shown in FIG. 4 may be configured with a piece of hardware or a piece of software. Alternatively, each component may be configured with a plurality of pieces of hardware or a plurality of pieces of software. Further, part of the components may be configured with hardware and the other part with software.

Figure 5:
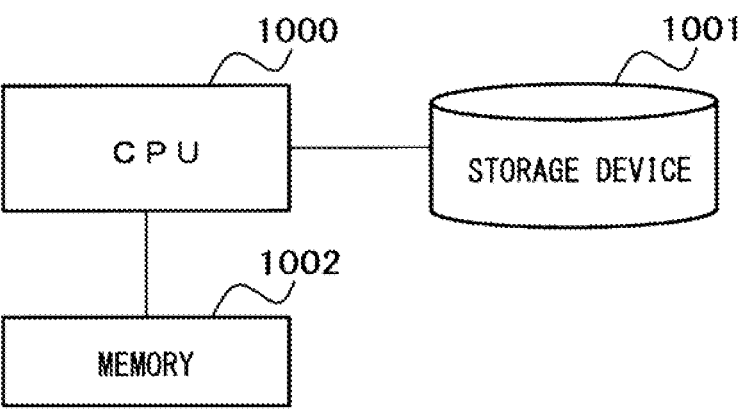
FIG. 5 It depicts a block diagram showing an example of a computer with a CPU.

When each component in the information processing circuit design apparatus 500 is realized by a computer having a processor such as a CPU (Central Processing Unit) and a memory, each component can be realized by the computer with the CPU shown in FIG. 5. The CPU 1000 executes processing (information processing circuit design process) in accordance with a program stored in a storage device 1001 to realize each function in the information processing circuit designing device 500 shown in FIG. 4. That is, the computer realizes the functions of the parameter table optimization unit 501, the parameter table generator 502, the parallel degree determination unit 503, and the calculator generator 504 in the information processing circuit designing device 500 shown in FIG. 4.

The storage device 1001 is, for example, a non-transitory computer readable medium. The non-transitory computer readable medium includes various types of tangible storage media. Specific examples of the non-transitory computer readable medium include a magnetic storage media (for example, a hard disk), a magneto-optical storage media (for example, magneto-optical disc), a compact disc-read only memory (CD-ROM), a compact disc-recordable (CD-R), a compact disc-rewritable (CD-R/W), and semiconductor memories (for example, mask ROM, programmable ROM (PROM), erasable PROM (EPROM), flash ROM).

The program may be stored in various types of transitory computer readable media. The transitory computer readable medium is supplied with the program through, for example, a wired or wireless communication channel, or, via electric signals, optical signals, or electromagnetic waves.

A memory 1002 is a storage means implemented by a random access memory (RAM), for example, and temporarily stores data when the CPU 1000 executes processing. A conceivable mode is that the program held in the storage device 1001 or in a transitory computer readable medium is transferred to the memory 1002, and the CPU 1000 executes processing on the basis of the program in the memory 1002.

Next, an operation of the information processing circuit design system is described with reference to the flowchart of FIG. 6.

The parameter table optimization unit 501 inputs a parameter set (multiple parameter values) learned in the training phase, and the parallel degree determination unit 503 inputs data indicating a predetermined network structure (step S11).

As a type of the deep learning algorithm that is one of the concepts of a network structure in this example embodiment, AlexNet, GoogLeNet, ResNet (Residual Network), SENet (Squeeze-and-Excitation Networks), MobileNet, VGG-16, or VGG-19 is considered. As the number of layers, which is one of the concepts of a network structure, the number of layers based on the type of deep learning algorithm is considered, for example. Note that the concept of a network structure could include a filter size.

Hereinafter, inputting data indicating a network structure is expressed as entering a network structure.

The parallel degree determination unit 503 determines a parallel degree for each layer (step S12). As an example, the parallel degree determination unit 503 determines the parallel degree N using the formula (1). For example, if the number of layers identified by the input deep learning algorithm type is 19, the parallel degree determination unit 503 determines the parallel degree for each of the 19 layers.

$$N = C_L / D_L \qquad (1)$$

In equation (1), $C_L$ indicates the number of clocks required to process all the pixels of one screen in the layer (target layer) for which the parallel degree is to be determined using a single product-sum calculator. $D_L$ indicates the number of clocks required (number of clocks allowed) to process one screen in the layer.

Taking the CNN shown in FIG. 11 as an example, suppose that in a layer (referred to as a layer in the first block) of one screen whose vertical size is 224 and whose horizontal size is 224 (i.e., 50176 pixels), a pixel is processed by one clock, i.e., the entire screen is processed by 50176 clocks. In contrast, in a layer (referred to as a layer in the fifth block) of one screen whose vertical size of 14 and whose horizontal size of 14, if a pixel is processed by 256 clocks in order to complete the processing of one screen in the same period, processing of one screen can be completed by 50176 clocks as same as those in the first layer. The number of processes of the convolution layer of the first block are 3 (vertical size)×3 (horizontal size)×3 (input channel)×64 (output channels), per pixel, i.e., 1728. Therefore, the number of clocks required to process all pixels with a single product-sum calculator is 1728×50176 pixels=8670412. 1728 is required as the parallel degree of the layer in the first block in order to complete processing an entire screen by 50176 clocks. On the other hand, the number of processes of the convolution layer of the fifth block are 3 (vertical size)×3 (horizontal size)×512 ((input channels)×512 (output channels), per pixel, i.e., 2359296. Therefore, the number of clocks required to process all pixels with a single product-sum calculator is 2359296×196 pixels=462422016. 9216 is required as the parallel degree of the layer in the fifth block in order to complete processing an entire screen by 50176 clocks.

By determining the parallel degree of each layer according to the desired calculation speed (processing volume for a screen/number of necessary clocks), for example, by determining the parallel degree of each layer based on formula (1), the calculator of each layer (specifically, the multiple basic circuits 300 included in the calculator) can be kept running at all times. In the configuration shown in FIG. 13, when no effort is made for the calculators 701-706, the utilization rate of calculator 706 is lower than the utilization rate of calculator 701. Taking the configuration described in Non-Patent Document 1 as an example, each layer is fully-parallel, so the utilization rate of the calculator is lower in the layer closer to the output layer. However, in this example embodiment, the utilization rates of the calculators in all layers can be maintained high.

The parameter table optimization unit 501 generates a parameter table 302 for each layer according to the determined parallel degree (step S13). Furthermore, the parameter table optimization unit 501 optimizes the generated parameter table 302 (step S14).

Figure 7:
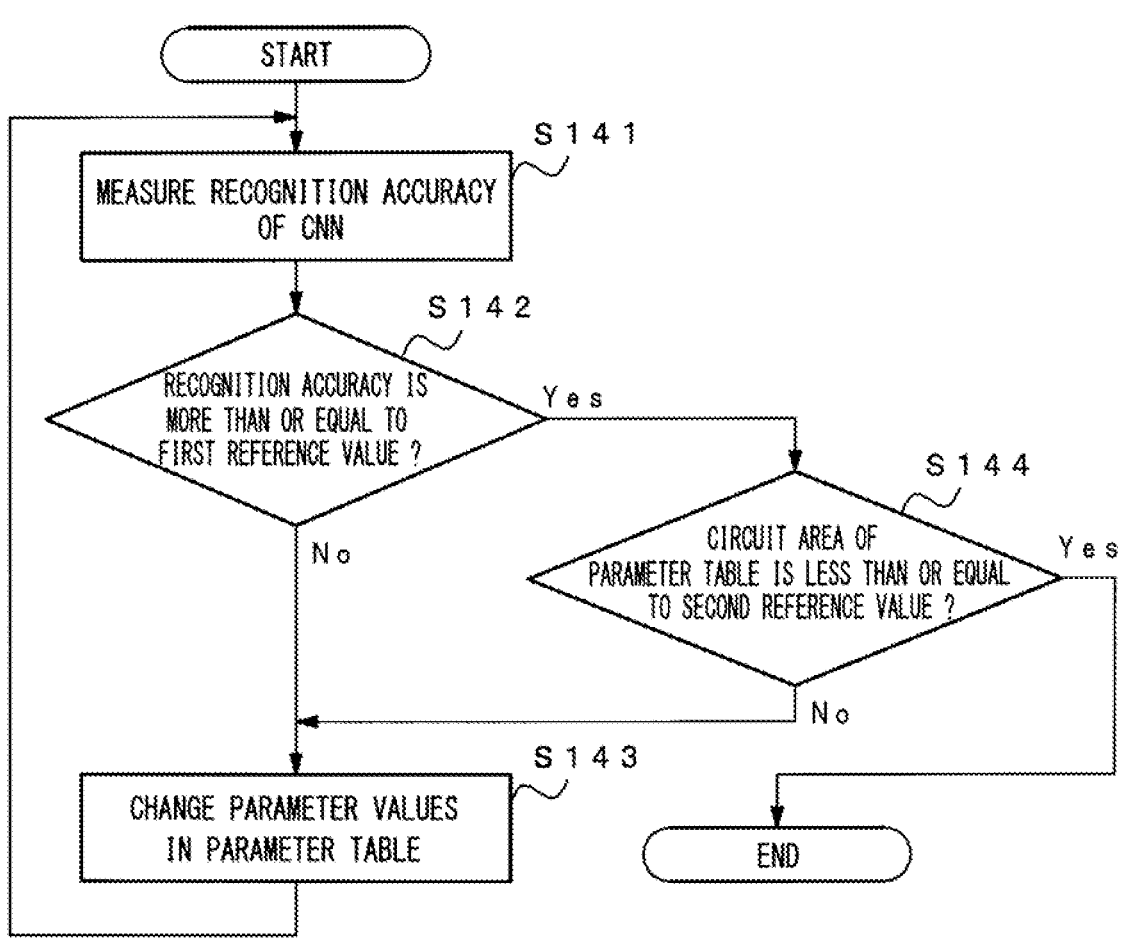
FIG. 7 It depicts a flowchart showing a process for optimizing a parameter table.

FIG. 7 is a flowchart showing an example of a process (parameter table optimization process) for optimizing the parameter table 302.

In the parameter table optimization process, the parameter table optimization unit 501 measures recognition accuracy of the CNN (inference unit) (step S141). In step S141, the parameter table optimization unit 501 performs a simulation using an inference unit which uses the number of basic circuits 300 according to the determined parallel degree and the circuit configuration of the parameter table. The simulation is an inference using appropriate input data. Recognition accuracy is then obtained by comparing the simulation result with the correct answers, for example.

The parameter table optimization unit 501 checks whether the recognition accuracy is more than or equal to the first reference value (step S142). The first reference value is a predetermined threshold value. When the recognition accuracy is more than or equal to the first reference value, the parameter table optimization unit 501 estimates the circuit area of the parameter table 302. Then, the parameter table optimization unit 501 checks whether the circuit area of the parameter table 302 is less than or equal to the second reference value (step S144). The second reference value is a predetermined threshold value. The parameter table optimization unit 501 can estimate the circuit area of the parameter table 302 based on the number of logic circuits in the combinational circuit constituting the parameter table 302, for example.

When the circuit area of the parameter table 302 is less than or equal to the second reference, the parameter table optimization unit 501 terminates the parameter table optimization process.

When the recognition accuracy is less than the first reference, or the circuit area of the parameter table 302 is more than the second reference, the parameter table optimization unit 501 changes the parameter values (step S143). Then, the processing moves to step S141.

In step S143, when the recognition accuracy is less than the first reference, the parameter table optimization unit 501 changes parameter values in a direction in which the recognition accuracy is expected to improve. If the direction in which the recognition accuracy is assumed to improve is unknown, the parameter table optimization unit 501 may change the parameter values in a cut and try manner.

In step S143, when the circuit area of the parameter table 302 is more than the second reference, the parameter table optimization unit 501 changes parameter values so that the circuit area of the parameter table 302 is reduced. Methods for changing parameter values to reduce the circuit area of the parameter table 302 are as follows, for example.

change the parameter value, in the parameter table 302, whose absolute value is less than a predetermined threshold to 0.

replace the parameter value (positive number), in the parameter table 302, that is greater than a predetermined threshold with the largest parameter value in the parameter table 302.

replace the parameter value (negative number), in the parameter table 302, that are smaller than a predetermined threshold with the smallest parameter value in the parameter table 302.

set a representative value for each predetermined region in the parameter table 302, and replace all parameter values in a region with the representative value. The representative value is one of an even value, an odd value, the mode, etc., as an example.

replace the parameter value with the neighboring parameter value in the parameter table 302.

The parameter table optimization unit 501 may use one of the above multiple methods, or a combination of two or more of the above multiple methods.

Figure 8:
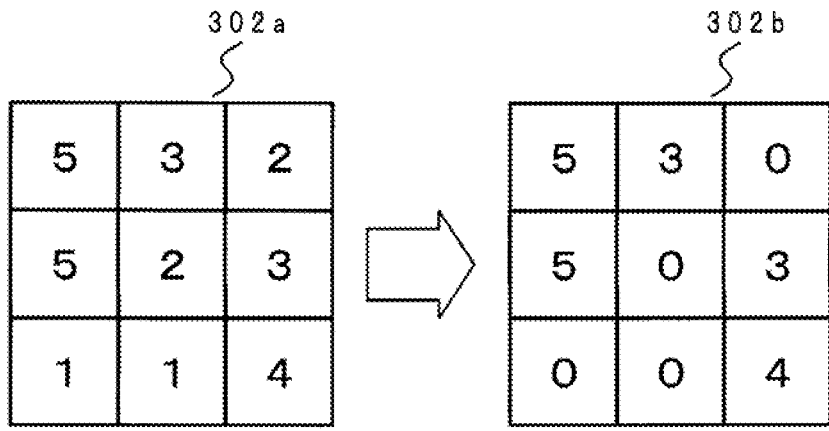
FIG. 8 It depicts an explanatory diagram showing how to change parameter values.

FIG. 8 is an explanatory diagram showing how to change parameter values. FIG. 8 illustrates an example of a parameter table of size 3×3. In the left side of FIG. 8, a parameter table 302a before the parameter values are changed is shown. In the eight side of FIG. 8, a parameter table 302b after the parameter values have been changed is shown.

In the example shown in FIG. 8, the parameter values that are smaller than the predetermined threshold of "3" is changed to "0".

The common objective of each of the above methods is to ensure that the same values appear frequently in the parameter table 302, i.e., that the parameter values of the same value increase, or that the same pattern is consecutive. The meaning of the consecutive same pattern is that a pattern with the parameter values "1", "2", and "3" (an example of the same pattern) appear in succession, for example.

As mentioned above, when the parameter table 302 is realized in a combinational circuit, the fewer the types of parameter values, the smaller the circuit scale of the combinational circuit. In addition, when the same pattern is consecutive, the circuit scale of the combinational circuit is also expected to be smaller.

In this example embodiment, the information processing circuit design system 500 terminates the parameter table optimization process when the recognition accuracy of the inference unit is more than or equal to the desired level (specifically, more than or equal to the first reference value) the circuit area becomes to be less than or equal to the desired size (specifically, less than or equal to the second reference value).

Figure 6:
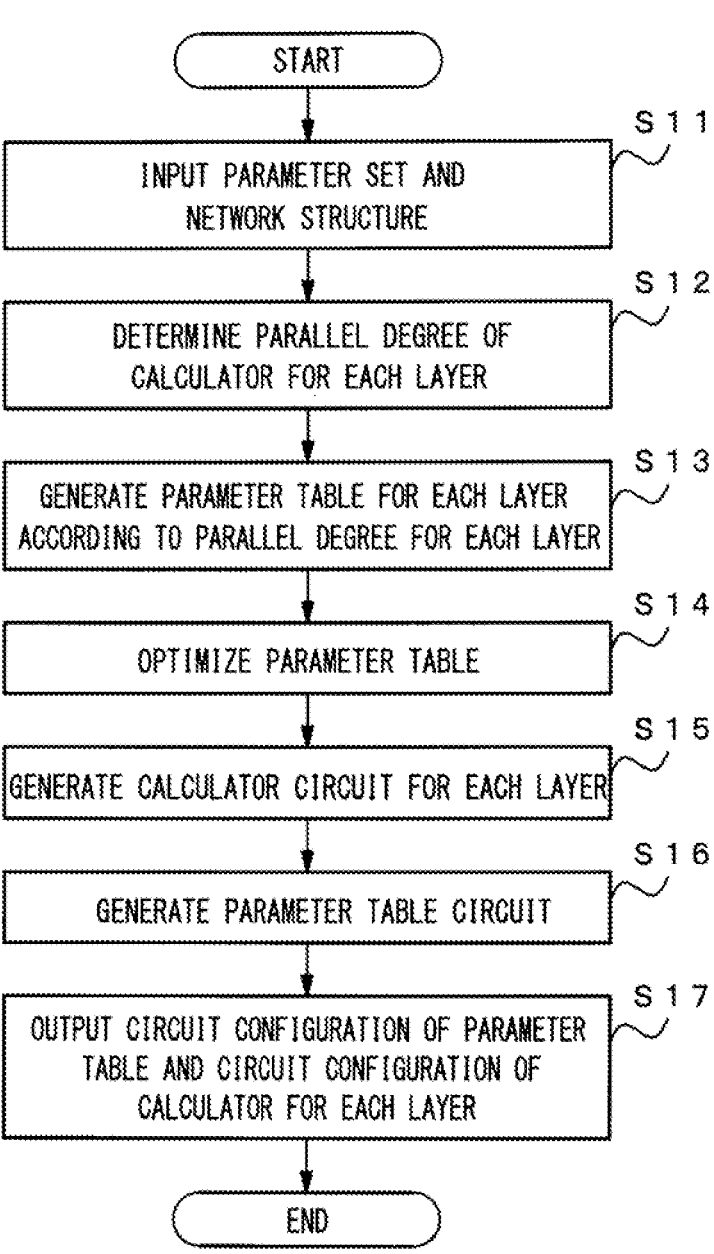
FIG. 6 It depicts a flowchart showing an operation of an information processing circuit designing device.

As shown in FIG. 6, the calculator generator 504 generates and outputs the circuit configuration of the calculator for each layer (steps S15, S17). In other words, the calculator generator 504 outputs the circuit configuration of the calculator according to the parallel degree of each layer determined by the parallel degree determination unit 503. In this example embodiment, since the basic circuit 300 for each layer is predetermined, the calculator generator 504 generates the number of basic circuits 300 (specifically, layer-specific product sum circuits 301) according to the parallel degree determined by the parallel degree determination unit 503.

The parameter table generator 502 generates and outputs the circuit configuration of the parameter table 302 (steps S16, S17). In other words, the parameter table generator 502 generates and outputs the circuit configuration for outputting the parameter values optimized by the parameter table optimizer 501. The circuit configuration for outputting the parameter values is a combinational circuit configuration that realizes a truth table as illustrated in the right side of FIG. 3, for example.

Note that in the flowchart in FIG. 6, the processes of steps S14 to S16 are executed sequentially, but the process of steps S14 and S16 and the process of step S15 can be executed in parallel.

Even if the parameter table optimization unit 501 that executes the process of step S14 is not provided, the parallel degree determination unit 503 determines the appropriate parallel degree, which has the effect of reducing the size of the circuit.

As explained above, in the inference unit as the information processing circuit of this example embodiment, since the parameter table 302 is realized in a combinational circuit, processing speed is improved as compared with the information processing circuit configured to read the parameter values from memory illustrated in FIG. 12. In addition, since the parallel degree of each layer in the inference unit is determined according to the calculation speed, etc., desired for that layer, the utilization rate of all layers can be maintained higher than when each layer is configured to be fully-parallel. Further, the size of the circuit of this example embodiment of inference unit is smaller than when each layer is configured as fully-parallel. As a result, the power consumption of the inference unit is reduced.

When the information processing circuit design system 500 is configured to optimize parameter values, the circuit scale of the inference unit can be made smaller.

Although the information processing circuit is described in this example embodiment using a CNN inference unit as an example, this example embodiment can be applied to other networks with layers that perform operations using input data and parameter values. In addition, although image data is used as input data in this example embodiment, this example embodiment can be utilized in networks that use input data other than image data.

Since power consumption in a data center is high, when implementing deep learning algorithm in the data center, it is desirable for deep learning algorithm to run at low power consumption. Since power consumption is reduced when the information processing circuit of this example embodiment is used, the information processing circuit of this example embodiment can be effectively used in the data center.

Low power consumption is also required on the edge side. The information processing circuit of this example embodiment can be effectively used on the edge side as well.

Figure 9:
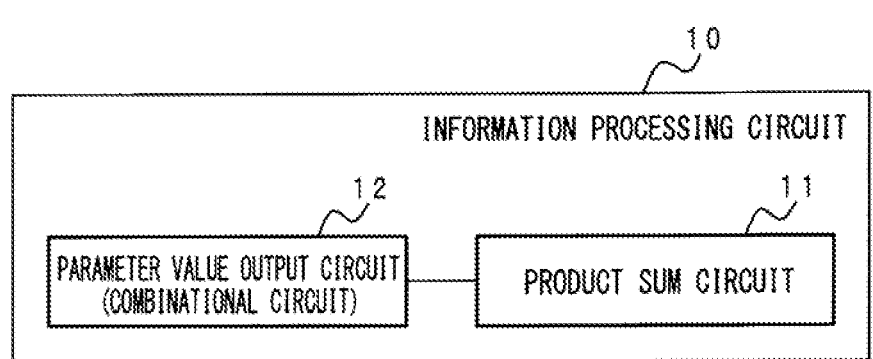
FIG. 9 It depicts a block diagram showing the main part of the information processing circuit.

FIG. 9 is a block diagram showing the main part of the information processing circuit. The information processing circuit 10 performs operations on layers in deep learning, and comprises a product sum circuit 11 (in the example embodiment, realized by the product sum circuit 311) which performs a product-sum operation using input data and parameter values, and a parameter value output circuit 12 (in the example embodiment, realized by the parameter table 302) which outputs the parameter values, wherein the parameter value output circuit 12 is composed of a combinational circuit.

Figure 10:
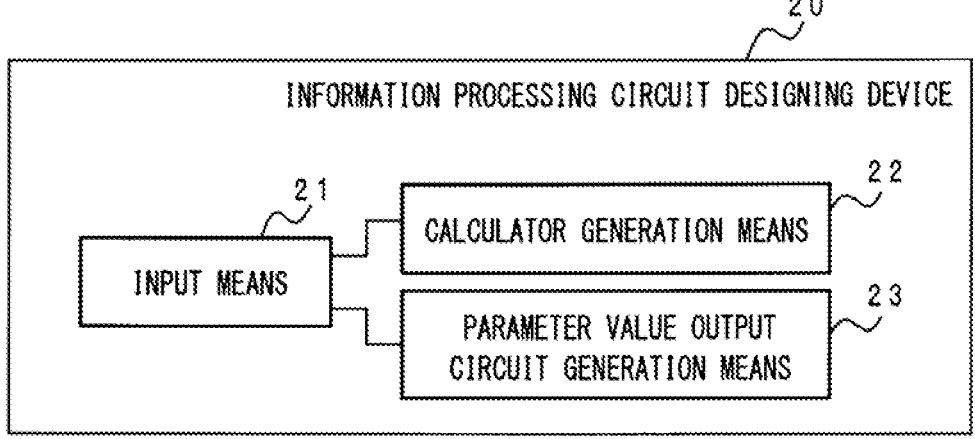
FIG. 10 It depicts a block diagram showing the main part of an information processing circuit designing device.

FIG. 10 is a block diagram showing the main part of the information processing circuit designing device. The information processing circuit designing device 20 is a device for generating an information processing circuit that performs operations on layers in deep learning, and comprises input means 21 (in the example embodiment, realized by a part of the parameter table optimization unit 501 and a part of the parallel degree determination unit 503) for inputting data for identifying multiple learned parameter values and a network structure, calculator generation means 22 (in the example embodiment, realized by the calculator generator 504) for generating a product sum circuit which performs a product-sum operation using input data and the parameter values, and specializing in a layer in the network structure, and parameter value output circuit generation means 23 (in the example embodiment, realized by the parameter table generator 502) for generating a combinational circuit outputting the multiple parameter values.

A part of or all of the above example embodiment may also be described as, but not limited to, the following supplementary notes.

(Supplementary note 1) An information processing circuit, that performs operations on layers in deep learning, comprising:
  a product sum circuit which performs a product-sum operation using input data and parameter values, and
  a parameter value output circuit which outputs the parameter values,
  wherein the parameter value output circuit is composed of a combinational circuit.

(Supplementary note 2) The information processing circuit according to Supplementary note 1, comprising
  a number of basic circuits corresponding to the number of parallel processes,
  wherein each of a plurality of the basic circuits includes the product sum circuit and the parameter value output circuit.

(Supplementary note 3) The information processing circuit according to Supplementary note 2, wherein the basic circuit has a layer-specific circuit configuration, and the parameter value output circuit outputs the parameters whose values are fixed.

(Supplementary note 4) A method of designing an information processing circuit for generating the information processing circuit performing operations on layers in deep learning, comprising:

inputting data for identifying multiple learned parameter values and a network structure, generating a product sum circuit which performs a product-sum operation using input data and the parameter values, and specializing in a layer in the network structure, and generating a combinational circuit outputting the multiple parameter values.

(Supplementary note 5) The method of designing an information processing circuit according to Supplementary note 4, wherein the product sum circuit for each layer and the combinational circuit for each layer are generated, in case where the deep learning is realized with multiple layers.

(Supplementary note 6) The method of designing an information processing circuit according to Supplementary note 4 or 5, further comprising determining parallel degree according to calculation speed required to the layer, and generating a number of the product sum circuits depending on the parallel degree.

(Supplementary note 7) The method of designing an information processing circuit according to any one of Supplementary notes 4 to 6, further comprising changing one or more parameter values among input multiple parameter values so that the parameter values of the same value increase.

(Supplementary note 8) The method of designing an information processing circuit according to any one of Supplementary notes 4 to 7, further comprising changing one or more parameter values among input multiple parameter values so that a pattern with the parameter values appears in succession.

(Supplementary note 9) The method of designing an information processing circuit according to Supplementary note 7 or 8, further comprising measuring accuracy of the information processing circuit, estimating a circuit area of the combinational circuit, and changing the parameter values repeatedly until the condition the accuracy of the information processing circuit is more than or equal to the first reference value, and the circuit area of the combinational circuit is less than or equal to the second reference value is satisfied.

(Supplementary note 10) A computer readable recording medium storing a program of designing an information processing circuit for generating the information processing circuit performing operations on layers in deep learning, the program for designing an information processing circuit causing a processor to execute:

a process of inputting data for identifying multiple learned parameter values and a network structure, a process of generating a product sum circuit which performs a product-sum operation using input data and the parameter values, and specializing in a layer in the network structure, and a process of generating a combinational circuit outputting the multiple parameter values.

(Supplementary note 11) The recording medium according to Supplementary note 10, wherein the program of designing an information processing circuit causes a processor to execute a process of generating the product sum circuit for each layer and the combinational circuit for each layer, in case where the deep learning is realized with multiple layers.

(Supplementary note 12) The recording medium according to Supplementary note 10 or 11, wherein the program of designing an information processing circuit causes a processor to execute a process of determining parallel degree according to calculation speed required to the layer, and a process of generating a number of the product sum circuits depending on the parallel degree.

(Supplementary note 13) The recording medium according to any one of Supplementary notes 10 to 12, wherein the program of designing an information processing circuit causes a processor to execute a process of changing one or more parameter values among input multiple parameter values so that the parameter values of the same value increase.

(Supplementary note 14) An information processing circuit designing device which generates the information processing circuit performing operations on layers in deep learning, comprising:

input means for inputting data for identifying multiple learned parameter values and a network structure, calculator generation means for generating a product sum circuit which performs a product-sum operation using input data and the parameter values, and specializing in a layer in the network structure, and parameter value output circuit generation means for generating a combinational circuit outputting the multiple parameter values.

(Supplementary note 15) The information processing circuit designing device according to Supplementary note 14, wherein in case where the deep learning is realized with multiple layers, the calculator generation means generates the product sum circuit for each layer and the parameter value output circuit generation means generates the combinational circuit for each layer.

(Supplementary note 16) The information processing circuit designing device according to Supplementary note 14 or 15, further comprising parallel degree determination means for determining parallel degree according to calculation speed required to the layer, wherein the calculator generation means generates a number of the product sum circuits depending on the parallel degree.

(Supplementary note 17) The information processing circuit designing device according to any one of Supplementary notes 14 to 16, further comprising parameter optimization means for changing one or more parameter values among input multiple parameter values so that the parameter values of the same value increase.

(Supplementary note 18) A program of designing an information processing circuit for generating the information processing circuit performing operations on layers in deep learning, causing a computer to execute: a process of inputting data for identifying multiple learned parameter values and a network structure,

15 a process of generating a product sum circuit which performs a product-sum operation using input data and the parameter values, and specializing in a layer in the network structure, and a process of generating a combinational circuit outputting the multiple parameter values.

(Supplementary note 19) The program of designing an information processing circuit according to Supplementary note 18, causing a computer to execute a process of generating the product sum circuit for each layer and the combinational circuit for each layer, in case where the deep learning is realized with multiple layers.

(Supplementary note 20) The program of designing an information processing circuit according to Supplementary note 18 or 19, causing a computer to execute a process of determining parallel degree according to calculation speed required to the layer, and a process of generating a number of the product sum circuits depending on the parallel degree.

(Supplementary note 21) The program of designing an information processing circuit according to any one of Supplementary notes 18 to 20, causing a computer to execute a process of changing one or more parameter values among input multiple parameter values so that the parameter values of the same value increase.

Although the invention of the present application has been described above with reference to the example embodiment, the present invention is not limited to the above example embodiment. Various changes can be made to the configuration and details of the present invention that can be understood by those skilled in the art within the scope of the present invention.

REFERENCE SIGNS LIST

10 Information processing circuit
11 Product sum circuit
12 Parameter value output circuit
20 Information processing circuit designing device
21 Input means
22 Calculator generation means
23 Parameter value output circuit generation means
100 Information processing circuit
201, 202, 203, 204, 205, 206 Calculator
211, 212, 213, 214, 215, 216 Parameter
300 Basic circuit
301 Product sum circuit
302 Parameter table
303 Register
400 Control unit
500 Information processing circuit designing device
501 Parameter table optimization unit
502 Parameter table generator
503 Parallel degree determination unit
504 Calculator generator
1000 CPU
1001 Storage device
1002 Memory

What is claimed is:

1. An information processing circuit, that performs operations on layers in deep learning, the information processing circuit comprising:

a product sum circuit configured to perform a product-sum operation using input data and parameter values,

a parameter value output circuit configured to output the parameter values, and a number of basic circuits corresponding to a number of parallel processes, wherein the parameter value output circuit comprises a combinational circuit, and wherein each of a plurality of the basic circuits includes the product sum circuit and the parameter value output circuit.

2. The information processing circuit according to claim 1, wherein the basic circuit has a layer-specific circuit configuration, and the parameter value output circuit outputs the parameters whose values are fixed.

3. A method of designing an information processing circuit configured to perform operations on layers in deep learning, the method comprising:

inputting data for identifying learned parameter values and a network structure;

generating a product sum circuit configured to perform a product-sum operation using input data and the parameter values, and specializing in a layer in the network structure;

generating a combinational circuit configured to output the multiple parameter values; and generating a number of basic circuits each including the product sum circuit and a parameter value output circuit which outputs the parameter values, wherein the number of basic circuits corresponds to a number of parallel processes.

4. The method of claim 3, wherein, based on the deep learning being realized with multiple layers, the product sum circuit for each layer and the combinational circuit for each layer are generated.

5. The method of claim 3, further comprising:

determining a parallel degree according to a calculation speed required to each layer; and generating a number of the product sum circuits depending on the parallel degree.

6. The method of claim 3, further comprising:

changing one or more parameter values among input multiple parameter values so that the parameter values of the same value increase.

7. The method of claim 3, further comprising:

changing one or more parameter values among input multiple parameter values so that a pattern with the parameter values appears in succession.

8. The method of claim 6, further comprising:

measuring accuracy of the information processing circuit;

estimating a circuit area of the combinational circuit; and changing the parameter values repeatedly until the accuracy of the information processing circuit is greater than or equal to a first reference value, and the circuit area of the combinational circuit is less than or equal to a second reference value.

9. The method of designing an information processing circuit according to claim 3, wherein the basic circuit has a layer-specific circuit configuration, and the parameter value output circuit is configured to output the parameters whose values are fixed.

10. An information processing circuit designing device which generates the information processing circuit configured to perform operations on layers in deep learning, the information processing circuit designing device comprising:

an input unit configured to input data for identifying learned parameter values and a network structure;

a calculator generator configured to generate a product sum circuit configured to perform a product-sum operation using input data and the parameter values, and specializing in a layer in the network structure;

a parameter value output circuit generator configured to generate a combinational circuit configured to output the multiple parameter values; and a basic circuit generator configured to generate a number of basic circuits corresponding to the number of parallel processes, each of the basic circuits including the product sum circuit and a parameter value output circuit configured to output the parameter values.

11. The information processing circuit designing device according to claim 10, wherein based on the deep learning being realized with multiple layers, the calculator generator is further configured to generate the product sum circuit for each layer and the parameter value output circuit generator is further configured to generate the combinational circuit for each layer.

12. The information processing circuit designing device according to claim 10, further comprising:

a parallel degree determination unit configured to determine a parallel degree according to a calculation speed required to each layer, wherein the calculator generator is further configured to generate a number of the product sum circuits depending on the parallel degree.

13. The information processing circuit designing device according to claim 10, further comprising:

a parameter optimization unit configured to change one or more parameter values among input multiple parameter values so that the parameter values of the same value increase.

14. The information processing circuit designing device according to claim 10, wherein the basic circuit has a layer-specific circuit configuration, and the parameter value output circuit is configured to output the parameters whose values are fixed.

* * * * *